United States Patent [19]
Hester

[11] Patent Number: 6,095,569
[45] Date of Patent: Aug. 1, 2000

[54] PLUG-IN COUPLING FOR PRESSURE FLUID SYSTEMS

[75] Inventor: Hilmar Hester, Wipperfürth, Germany

[73] Assignee: Armaturenfabrik Hermann Voss GmbH & Co., Germany

[21] Appl. No.: 09/085,272

[22] Filed: May 26, 1998

[51] Int. Cl.⁷ .................................................... F16L 35/00
[52] U.S. Cl. ................................ 285/81; 285/83; 285/86; 285/321; 285/906
[58] Field of Search .............................. 285/93, 321, 924, 285/23, 81, 82, 101, 102, 306, 83, 86, 906

[56] References Cited

U.S. PATENT DOCUMENTS

| | | |
|---|---|---|
| 1,509,651 | 9/1924 | Iftiger . |
| 3,163,223 | 12/1964 | Bauer et al. ............................. 285/306 |
| 3,215,204 | 11/1965 | Sims ....................................... 285/306 |
| 3,317,220 | 5/1967 | Bruning ................................... 285/317 |
| 3,398,977 | 8/1968 | Yoneda . |
| 3,744,824 | 7/1973 | Roos ....................................... 285/317 |
| 4,647,081 | 3/1987 | Landgraf et al. ........................ 285/317 |
| 5,120,085 | 6/1992 | Shin ........................................ 285/317 |

FOREIGN PATENT DOCUMENTS

0373920  6/1990  European Pat. Off. .

*Primary Examiner*—Dave W. Arola
*Attorney, Agent, or Firm*—Harness, Dickey & Pierce, P.L.C.

[57] ABSTRACT

A plug-in coupling for pressure application systems, including two coupling components such as a housing component and a connector component. The connector component is sealed insertable into a locating opening of the housing component, and is arrestable against loosening by a locking device. The locking device has an elastically deformable holding element, which is located on the side of one coupling component in such a way that, in the inserted state, it engages behind an arresting step of the other coupling component, locking with positive fit, for arresting said connector component. The holding element is designed ring-shaped and comprises several individual annular segments and one concentric spring lock washer component which presses the annular segments with radially operating spring resistance that each annular segment can move radially against or through the spring resistance of said spring lock washer component during the plugging-in.

26 Claims, 12 Drawing Sheets

PLUG-IN COUPLING FOR PRESSURE FLUID SYSTEMS

BACKGROUND AND SUMMARY OF THE INVENTION

The present invention concerns a plug-in coupling for pressure application systems, consisting of two coupling components, namely a housing component and a connector component, whereby the connector component, is sealed insertable into a locating opening of the housing component, and is arrestable against loosening by a locking device, and whereby the locking device has an elastically deformable holding element, which is located on the side of one coupling component in such a way that, in the inserted state, it engages behind a resting step of the other coupling component, locking with positive fit, for arresting the connector component.

Such plug-in couplings have been known for a long time through numerous publications. Here, only GB-A-799 155 and EP-B-0 005 865 will be given as examples. In accordance with the former publication, a retaining ring is pre-assembled in a peripheral groove on the connector component. During insertion, the retaining ring becomes elastically, radially, inwardly deformed, i.e. contracted, over an inner cone surface in the mouth region of the housing component's locating opening. The latter publication describes examples in which a retaining ring or holding clip is inside an inner housing recess and, during the connector's insertion, becomes radially extended over an outer cone provided at its end, until it subsequently locks into an outer ring groove of the connector component.

The problem in known plug-in couplings like this, is that, in the design for high system pressures, the holding element has to be dimensioned sufficiently strong, with large cross section in particular, so that it can guarantee sufficiently high retention force to prevent loosening of the connector component. Because of the large radial forces required to deform the corresponding holding element, this leads to the disadvantage that very large mating forces are required for insertion. Currently, these even make plugging-in by hand impossible.

The objective of the present invention is to improve a plug-in coupling of the generic type such that relatively large retention forces are simultaneously guaranteed alongside relatively small mating forces, in such a way that manual plug-in is easily possible even in designs for high pressures.

This is attained, in accordance with the invention, in that the design of the holding element is ring-shaped and consists, in such a way, of several individual annular segments and one concentric spring lock washer component which presses the annular segments with radially operating spring resistance, that each annular segment can move radially against or through the spring resistance of the spring lock washer component during the plugging-in. Through this embodiment in accordance with the invention, the individual annular segments can themselves be designed relatively inelastic and dimensionally stable, and advantageously in fact with a basically rectangular annular cross section (as viewed in a radial section). An extraordinarily large retention force can be attained this way, while the mating force is advantageously small, because only the radial spring resistance of the spring lock washer component is operating during the radial movement of the individual annular segments (apart from friction). The mating force is thereby only determined by the spring lock washer component, which can be designed relatively soft to advantage, i.e. with small radial force. The mating force is thereby completely independent of the size of the holding element's circular cross section. An optimal locking action is moreover attained, in that each annular segment moves absolutely perfectly radially, without elastic deformation.

Additional advantageous characteristics of the invention are contained in the dependent claims and the following description.

BRIEF DESCRIPTION OF THE DRAWINGS

The invention will be explained in more detail on the basis of several examples illustrated in the drawing. The drawing shows.

The same components are given the same labels in the drawing's various figures and, as a rule, each will therefore only be described once.

DETAILED DESCRIPTION OF THE PREFERRED EMBODIMENT

In all embodiments, a plug-in coupling in accordance with the invention consists of two coupling components, namely a housing component 2 and a connector component 4. The connector component 4 is sealed around its perimeter with a basically cylindrical connecting shaft 6, is insertable into a locating opening 8 of the housing component 2, and, in the inserted state, is arrestable against loosening by a locking device 10. The locking device 10 has a holding element 12 for this, which is elastically deformable in the radial direction and which is located on the side of one coupling component (the housing 2 in the illustrated example), and, for arresting the connector component 4 in the inserted state, engages behind an arresting step 14 of the other coupling component (as illustrated), preferably the connector component 4 or the connecting shaft 6, and locks with positive fit. This locked state is illustrated in the top half of FIG. 1 to provide an example.

It is advantageous for the arresting step 14 to be formed by an outer ring groove 16 on the connecting shaft 6. This outer ring groove 16 has a cylindrical base which, on the side facing the direction of insertion, proceeds into a flank forming the arresting step 14. The groove's base encompasses an angle of at most 90° with the arresting step 14, to guarantee a clean arrest with positive fit. A gasket 18 sits in another circular groove of the connecting shaft 6 for sealing the perimeter.

Figure 13:
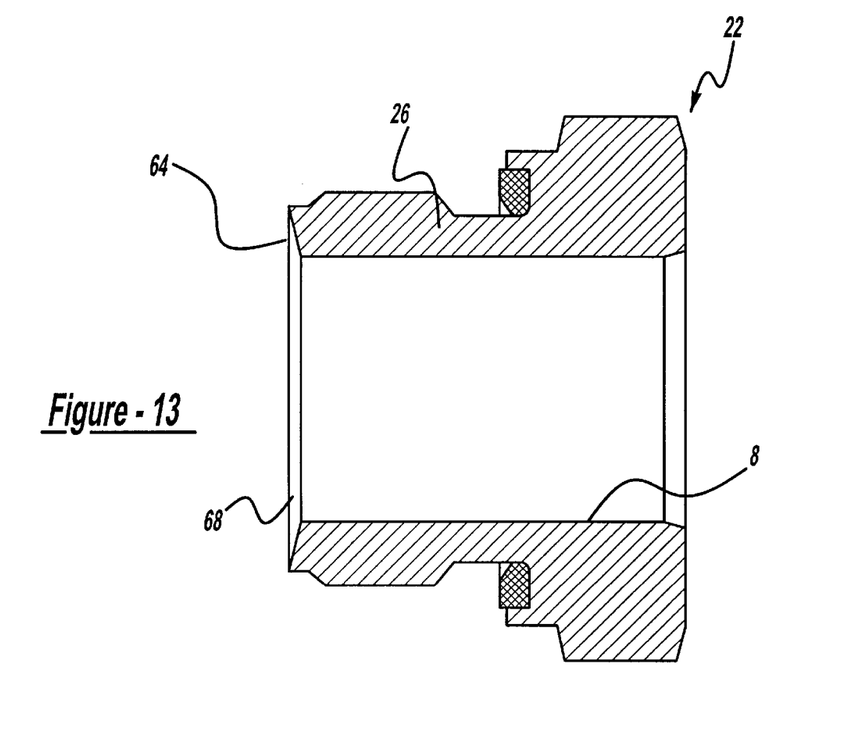
FIG. 13 is a longitudinal section of a housing component, similar to FIG. 7, in the embodiment of FIG. 10.
Figure 15:
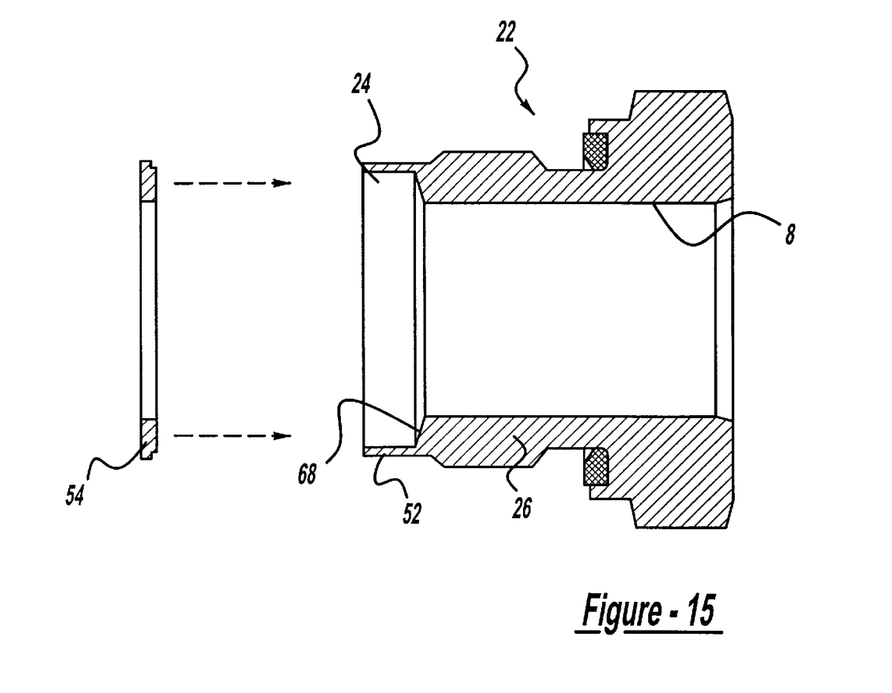
FIG. 15 is an exploded section of individual components of the embodiment of FIG. 14.
Figure 16:
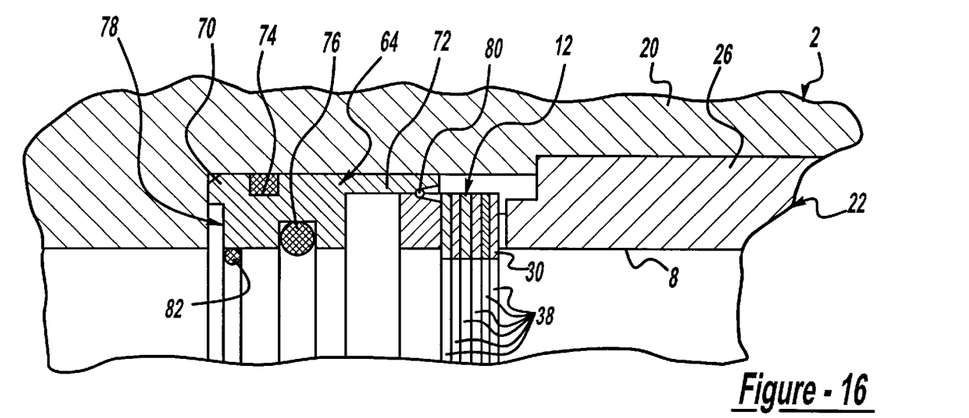
FIGS. 16 through 20 each are partial longitudinal sections of a plug-in coupling in an advantageous arrangement in various states, before and during insertion, in the inserted position, and during detachment of the plug-in unit.
Figure 17:
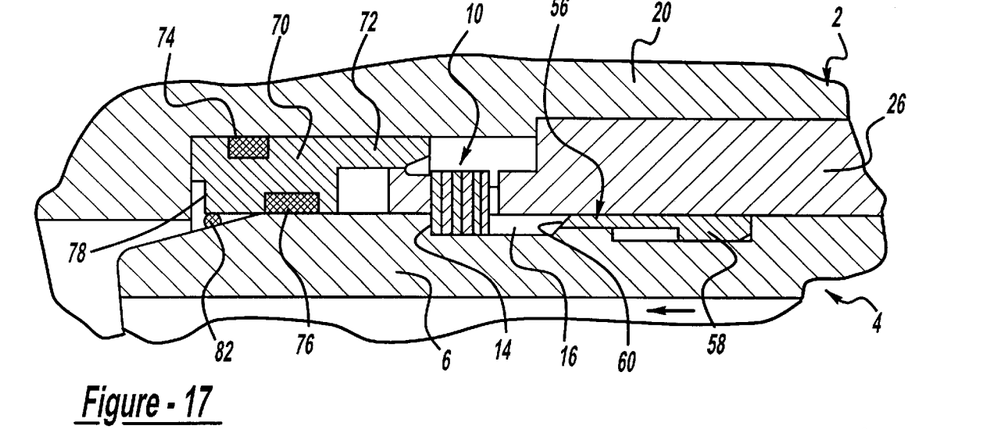
Figure 18:
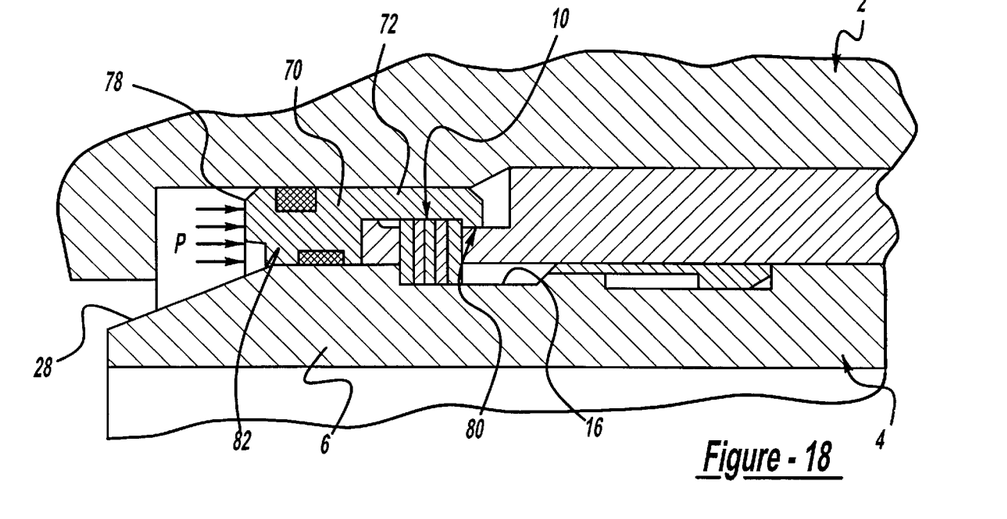
Figure 19:
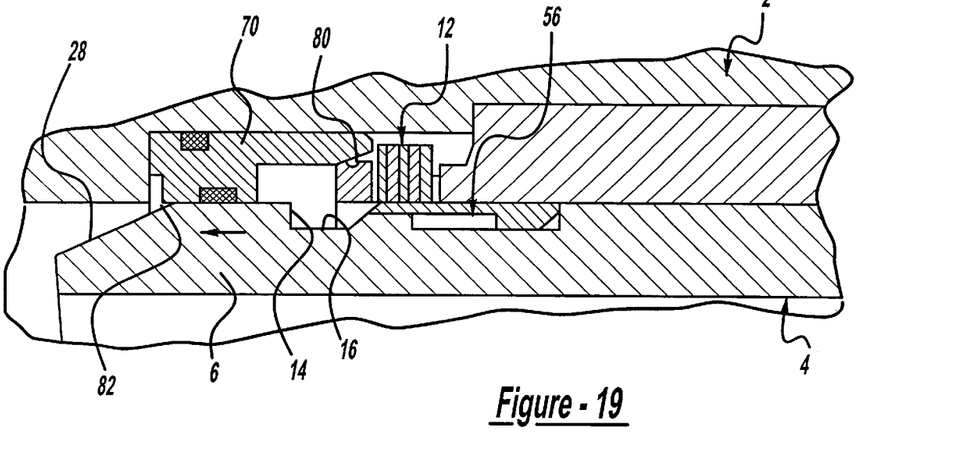
Figure 20:
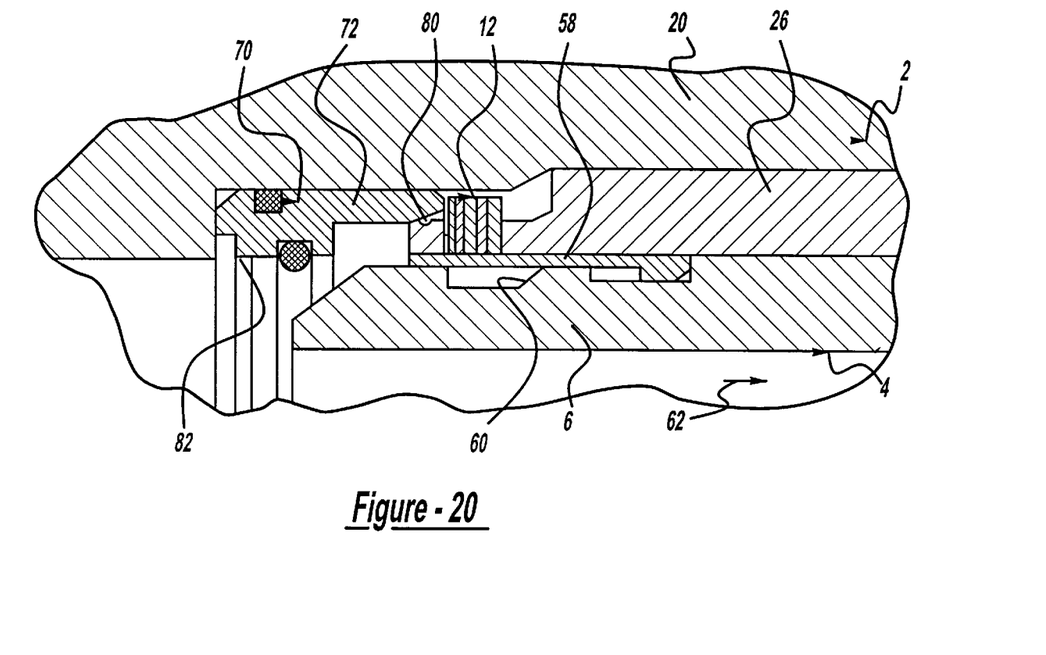

In order to guarantee quick and simple assembly for the individual components, particularly the holding element 12, the housing component 2 in the preferred embodiments consists of 2 parts, detachably connected with each other. These are a base part 20 and a locking part 22. The base part 20 and the locking part 22 both border a chamber 24 for receiving the holding element 12 locally. As illustrated, the locking part 22 be designed as an insert 26, in the shape of a male fitting for pipes for example, which is basically cylindrically hollow thereby forming a part of the locating opening 8, and which can be inserted locally into an opening of the base part 20. The separate drawings of this insert 26 in FIGS. 7, 13, and 15 will be referenced for this as an example. The arrangement of the locking part 22 is nevertheless basically arbitrary. This part can therefore even be connected with the base part 20 by other appropriate fasteners, a lock-in fastener and/or a bayonet fastener, for example. Moreover, the locking part 22 can also be designed arbitrarily lid-like, in the shape of a plane obturator disc, for example (cf. DE 39 25 293 C2 and DE 38 10 385 A1 for this). It is therefore always just a matter of locking the locating chamber for the holding element and making possible the assembly/disassembly of the holding element (possibly together with the connector) through a disassembly and/or change of location of the locking part.

The connector component 4 has an outer cone surface 28 on the connecting shaft's (6) open end, for radially elastic spreading of the holding element 12, which locally projects into the locating opening 8 and therefore into the connecting shaft's 6 cross-sectional region.

Figure 2:
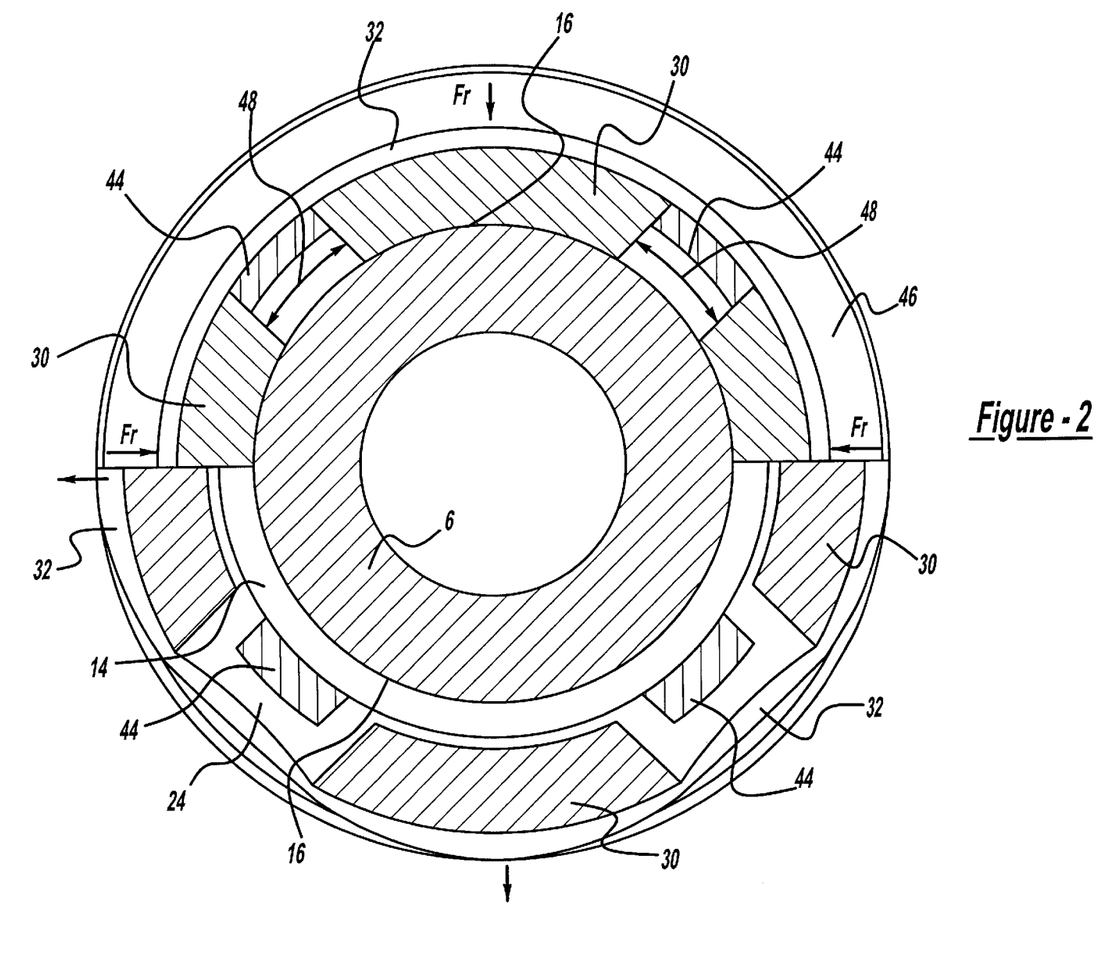
FIG. 2 is a greatly enlarged cross section in the plane II—II of FIG. 1.
Figure 3:
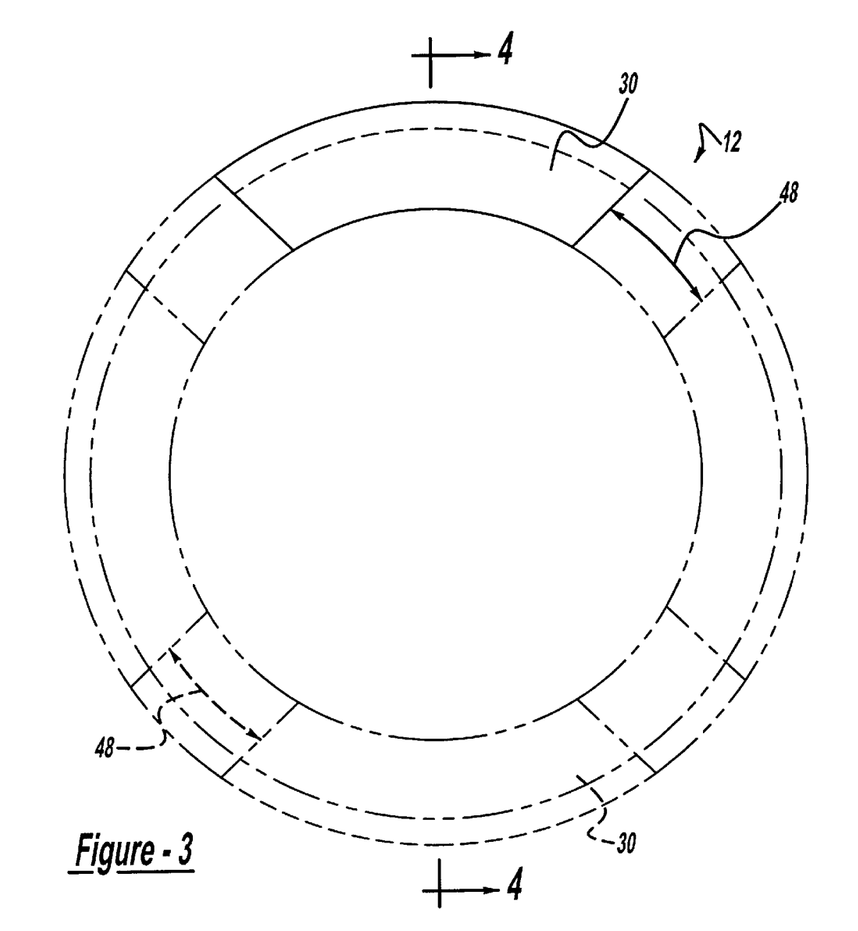
FIG. 3 is a top view of a holding element in accordance with the invention in a first embodiment (corresponding to FIGS. 1 and 2)

As can be seen in the examples of FIGS. 2 and 3, the invention provides that the holding element 12 is designed circularly shaped and thereby consists of several individual annular segments 30 and one concentric spring lock washer component 32 pressing the annular segments 30 with a radially operating spring resistance $F_r$, in such a way that each annular segment 30 is radially movable on the whole against the spring lock washer's 32 spring resistance $F_r$ while being plugged-in, as shown in the bottom half of FIG. 2, in particular. This means that the annular segments 30 are first pushed against the spring resistance $F_r$ during the plugging-in of the connector component 4 (preferably moved outwards in the illustrated example) in such a way that the connecting shaft 6 can be inserted farther. The annular segments 30 can then subsequently move back radially again because of the spring resistance $F_r$, until they engage behind the arresting step 14, locking with positive fit.

Figure 4:
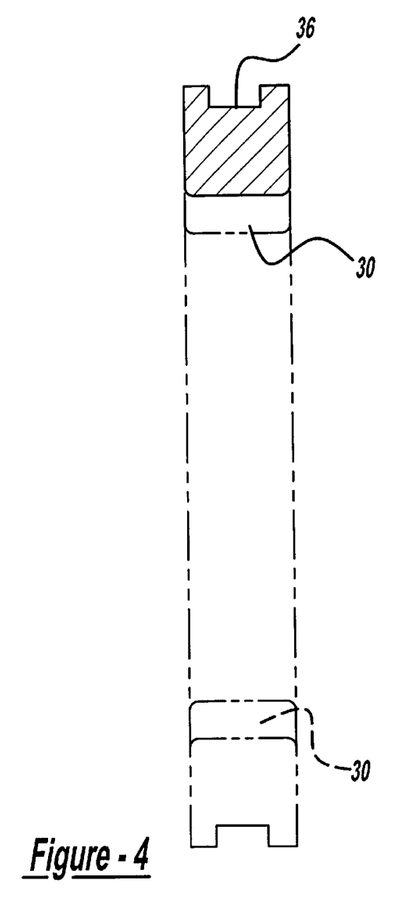
FIG. 4 is a radial section in the plane IV—IV of FIG. 3.

As can be seen in FIG. 4 for example, the individual annular segments 30 preferably have an essentially rectangular annular cross-section (as seen in the radial section). Because of this, the individual annular segments 30 are themselves designed relatively inelastic and dimensionally stable, so that they practically don't deform during the plugging-in, but only move entirely radially (relative to their respective radial axial line of symmetry). The elastic spring lock washer component 32 can be made of at least one wire lock washer, helical lock spring, long-range elastic molded ring, or the like. A helical lock spring is understood to mean a wound helical spring with a torus-shaped gradient. In the embodiment according to FIG. 1, for example, the spring lock washer component 32 consists of two O-rings 34 made of a long-range elastic material, of a conventional plastic for packing rings, for example.

Appropriately, the holding element 12 consists of at least three annular segments 30, particularly four in the illustrated embodiments, designed and arranged with radial symmetry. In the preferred embodiments, where the holding element 12 is located in the housing component 2 and locks in place radially inwards in the direction of the connecting shaft 6, it is provided that the spring lock washer component 32 coaxially encircles the annular segments 30 from outside so that the radial spring resistance $F_r$ is directed radially inwards.

Figure 1:
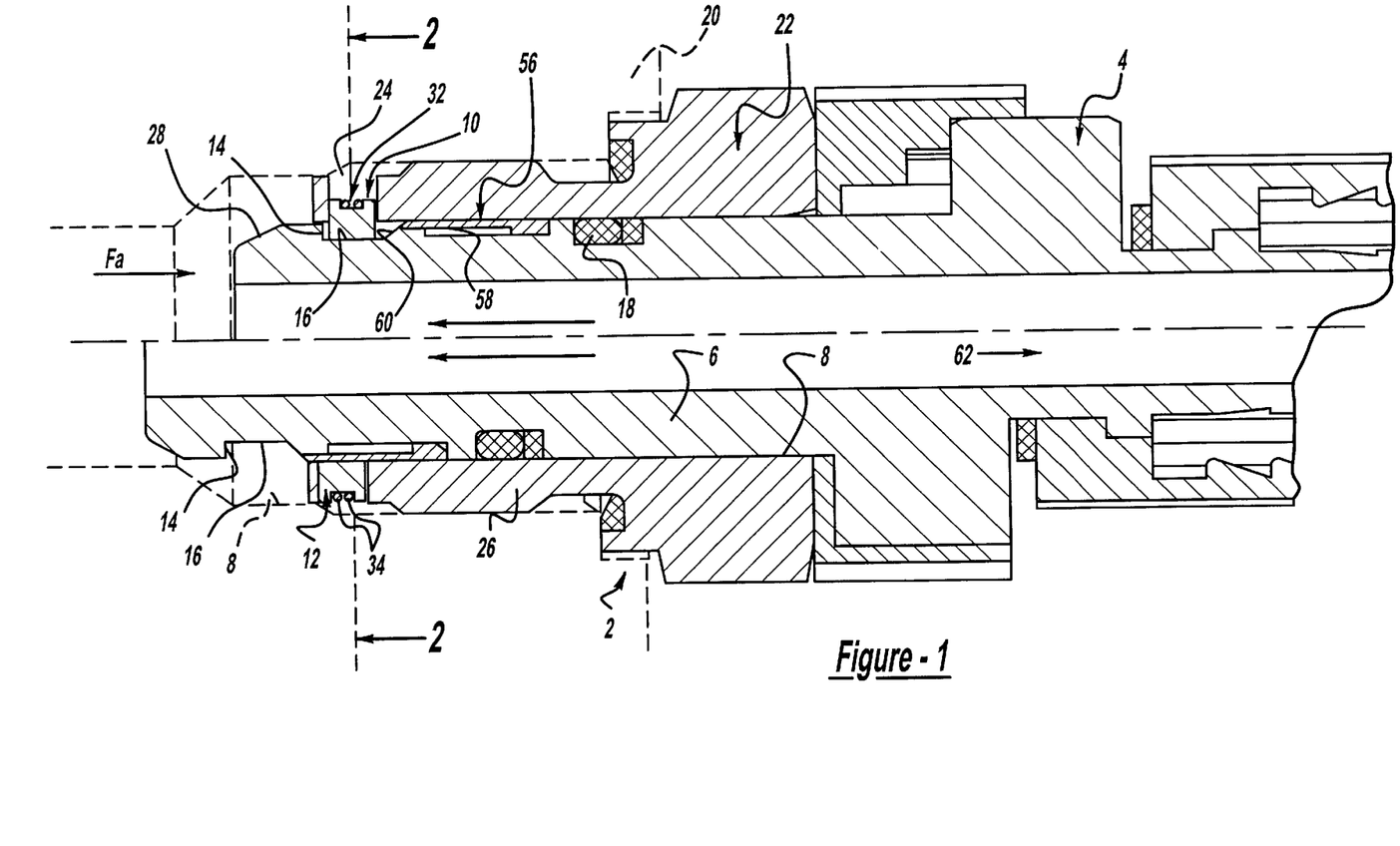
FIG. 1 is a longitudinal section through a plug-in coupling in accordance with the invention in a first embodiment, where the arrested position can be seen in the top half of the figure and a position for detaching the connector component in the bottom half.

As can be seen in FIGS. 1, 3, and 4, for example, the individual annular segments 30 can consist of a solid material, including but not limited to plastic or metal. In this embodiment, it is advantageous for the annular segments 30, on their surface facing radially outwards, to each have a retaining groove 36, running around the perimeter, for the spring lock washer component 32. See FIG. 4.

Figure 5:
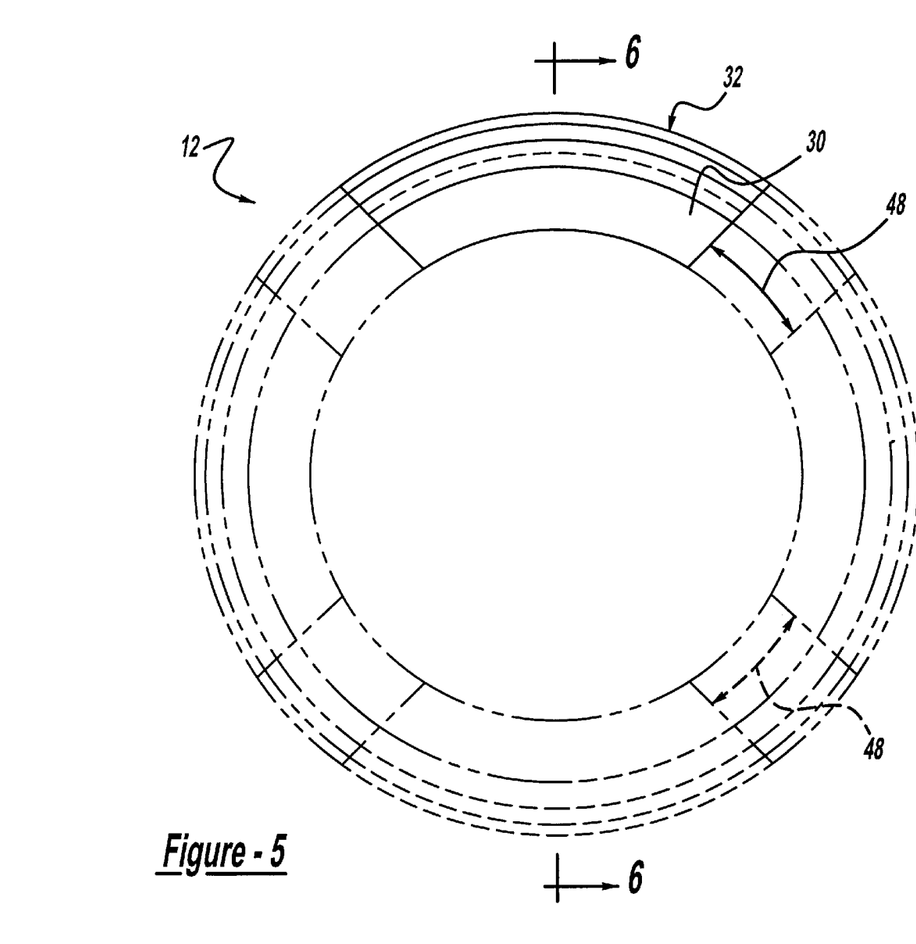
FIG. 5 is a diagram similar to FIG. 3 for a second embodiment of a holding element in accordance with the invention.
Figure 6:
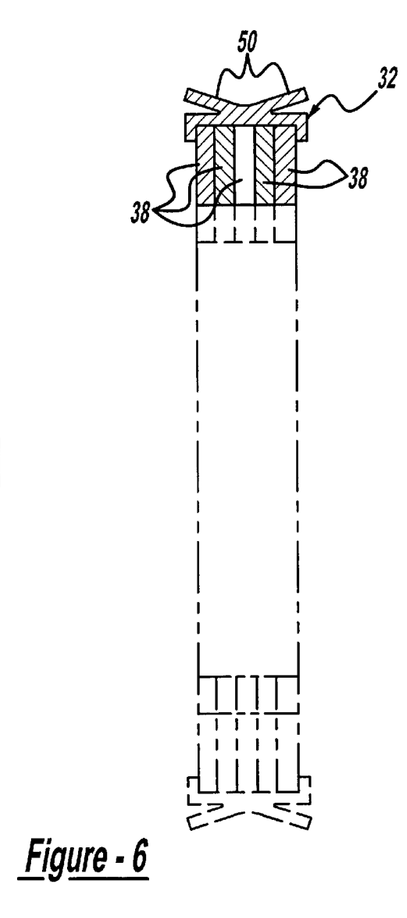
FIG. 6 is a section similar to FIG. 4 of the second embodiment of the holding element in the plane VI—VI of FIG. 5.

As an alternative, it is illustrated in FIGS. 5 and 6 that each annular segment 30 can consist of several individual elements 38 lying after each other as seen from the direction of insertion. These individual elements 38 are preferably designed lamellar and appropriately consist of sheet metal. In this embodiment, the spring lock washer component 32 is appropriately designed as an elastic profiled ring, which radially and axially engages the lamellar individual elements 38 such that they are held together in a package-like arrangement; see FIG. 6 in particular. It is advantageous for five or six uniform lamellar individual elements 38 to lie together package-like.

Because of the division of the holding element 12 into the several annular segments 30, it is advantageous for assembly, above all, if the annular segments 30 are clamped into a retainer 40. Here it is of special advantage when the retainer 40 is an integral component of the locking part 22 or of the insert 26. This results in a simple assembly because the individual annular segments 30 can be inserted into the retainer 40 together with the spring lock washer component 32 when the insert 26 is detached. It only remains to insert the insert 26 into the base part's 20 corresponding locating opening to position the holding element 12 into the locating opening 8 in the correct place. Conversely, detachment, even a detachment of the connector component 4, is possible because the insert 26 can be extracted in common with the holding element 12 and possibly with the inserted connector component 4.

Figure 7:
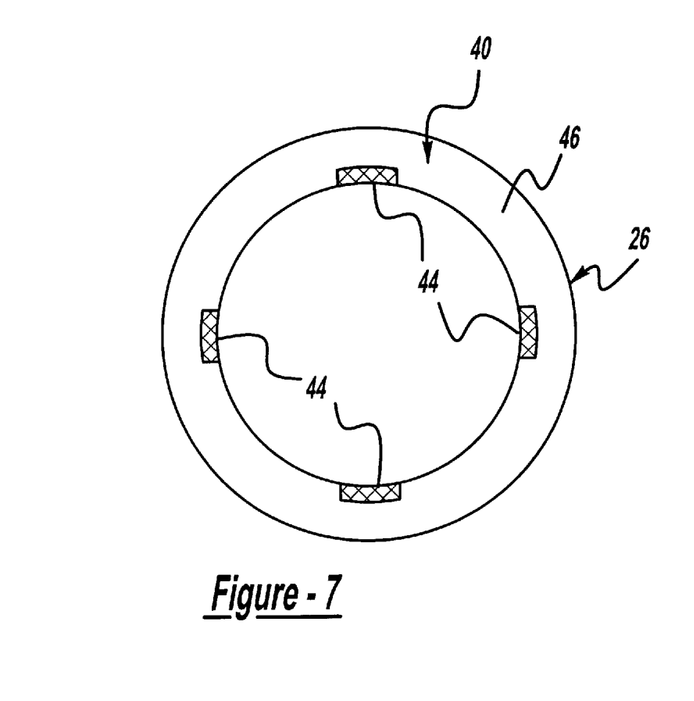
FIG. 7 is a longitudinal section similar to FIG. 1 of an individual component of the housing component with an integrated retainer for the holding element.
Figure 8:
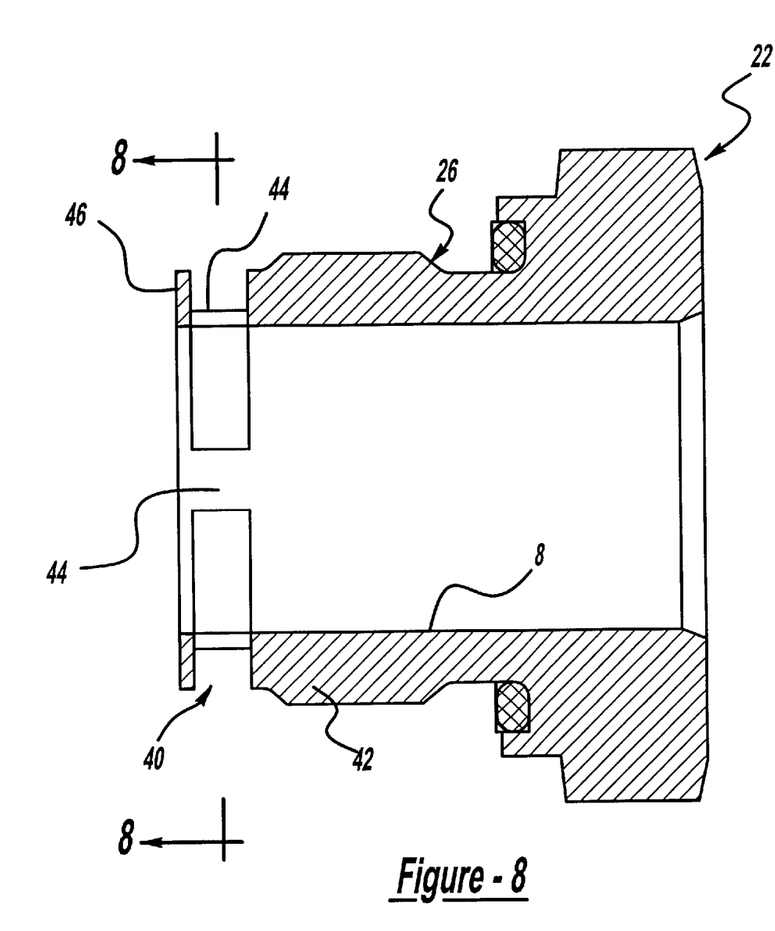
FIG. 8 is a cross section in the plane VIII—VIII of FIG. 7.

In the example given by FIGS. 7 and 8, the retainer 40 is shaped by a particular slot at the end region of the insert 26 to be inserted, a radial slot with a radial ring land 46 on the end in the illustrated example, or, preferable for production engineering but not illustrated here, by an axial slot with a cap clipped on the end or resiliently located retaining ring. As illustrated, four axial fastening crosspieces 44, arranged equally distributed around the perimeter, extend in particular from the cylindrically hollow outside thread section 42 up to a radial ring land 46 on the end. In accordance with FIG. 2, the holding element's 12 individual annular segments 30 are each arranged between the fastening crosspieces 44 in the peripheral direction, so that spacings 48 are formed in the peripheral direction between each of the annular segments 30 for the fastening crosspieces 44. This produces an advantageous possibility of centering the holding element 12, because the spring lock washer component 32 encircles the retainers 40 fastening crosspieces 44 coaxially, relative to the longitudinal center line. The upper half of FIG. 2 is a reference for this. The annular segments 30 are moved radially outwards in the process of connecting, as seen in the bottom half of FIG. 2, so that the spring lock washer component 32 is raised off the fastening crosspieces 44 and then extends essentially straight between the annular segments 30 as the secant of its circular perimeter.

Figure 9:
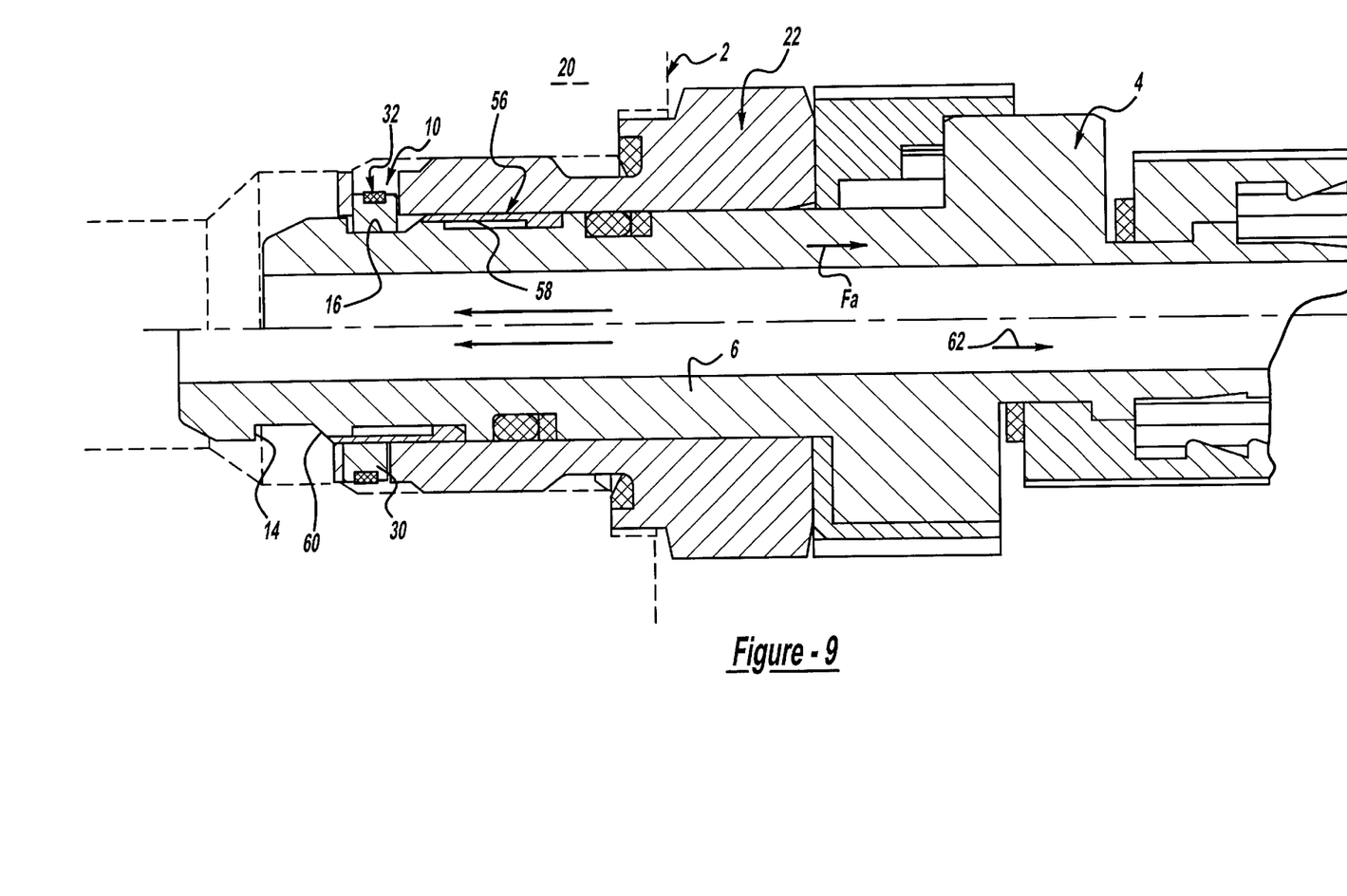
FIG. 9 is a longitudinal section through a plug-in coupling in accordance with the invention that is similar to FIG. 1, but in an alternative embodiment.

This last described arrangement similarly also holds for the embodiment of the holding element 12 seen in FIGS. 5 and 6. Here in addition to the centering, however, it is provided that the spring lock washer component 32 has radially elastic deformable centering shoulder elements 50 which support themselves in the housing component 2. In the embodiment of FIG. 9, the spring lock washer component 32 is designed with an essentially rectangular circular cross section of a long-range elastic material. Here, in accordance with FIG. 10, a radially elastically deformable centering shoulder element 50 is provided, which supports itself in the housing component 2 to center the holding element 12 and allows a spreading of the annular segments 30 through elastic deformation during the insertion process, see the bottom half of FIG. 10.

Figure 10:
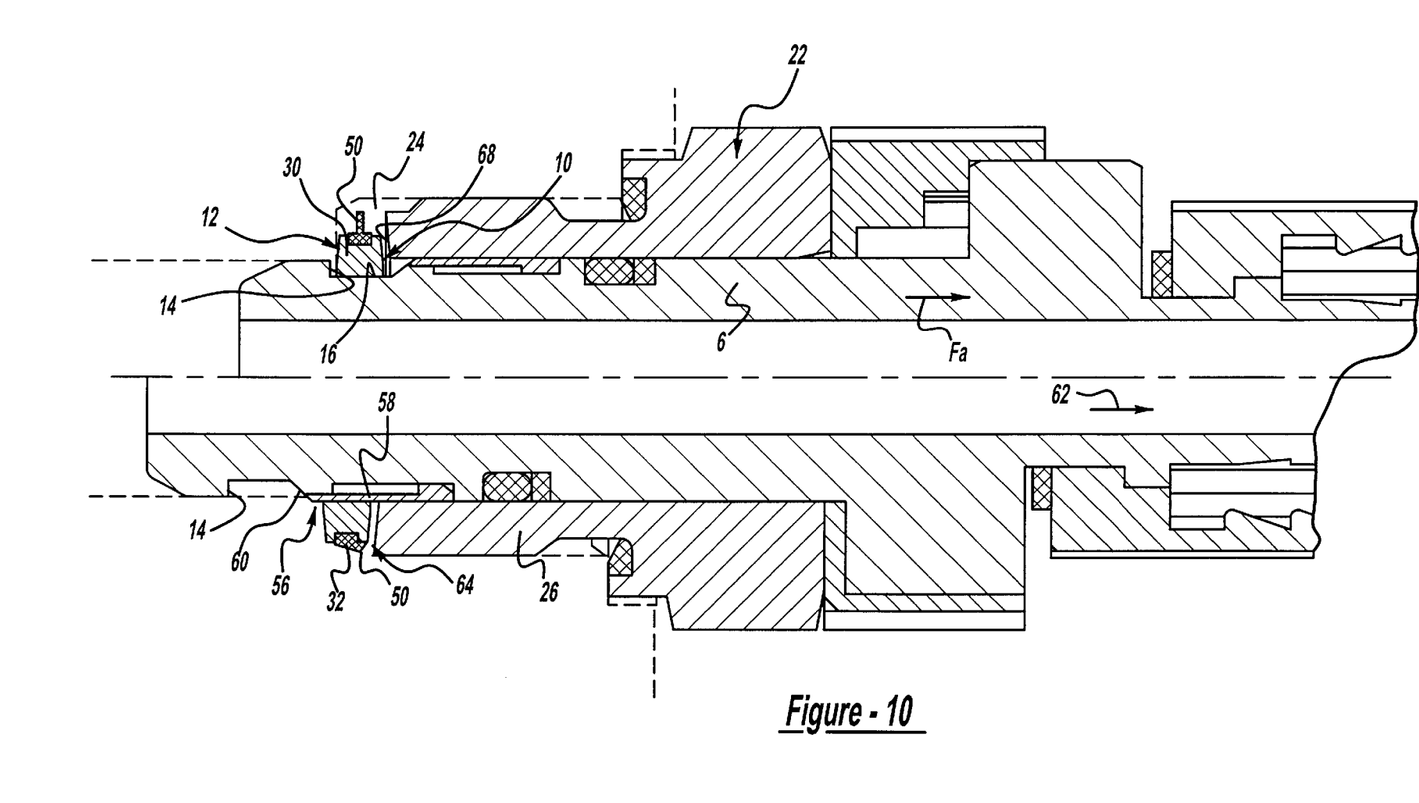
FIG. 10 is another embodiment of the plug-in unit in accordance with the invention, again in longitudinal section similar to FIGS. 1 and 9.
Figure 11:
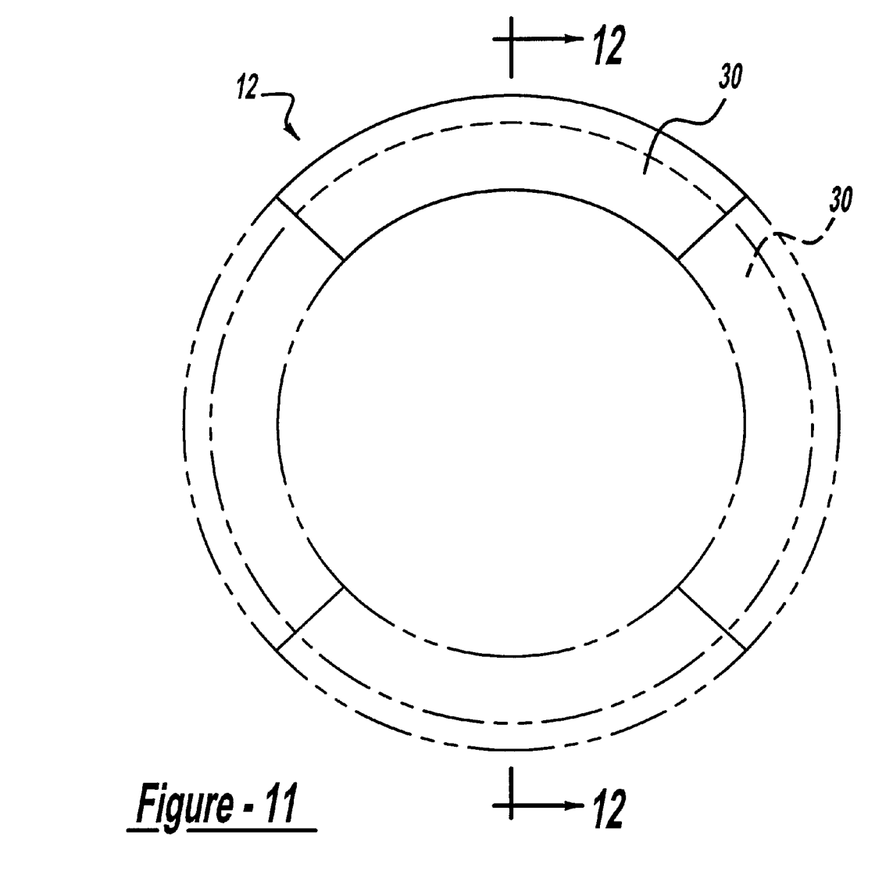
FIG. 11 is an enlarged top view of the holding element in the embodiment according to FIG. 10.
Figure 12:
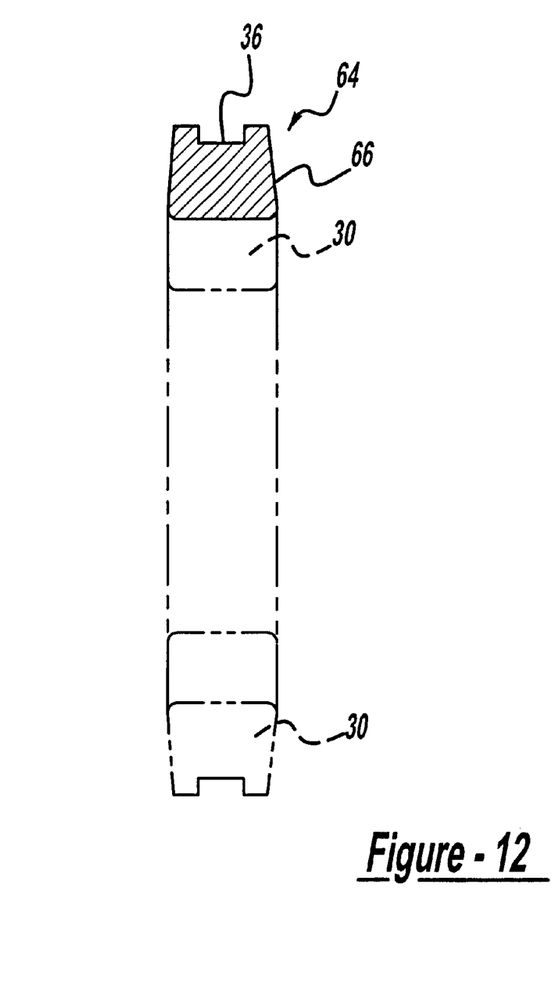
FIG. 12 is a radial section in the plane XII—XII of FIG. 11.
Figure 14:
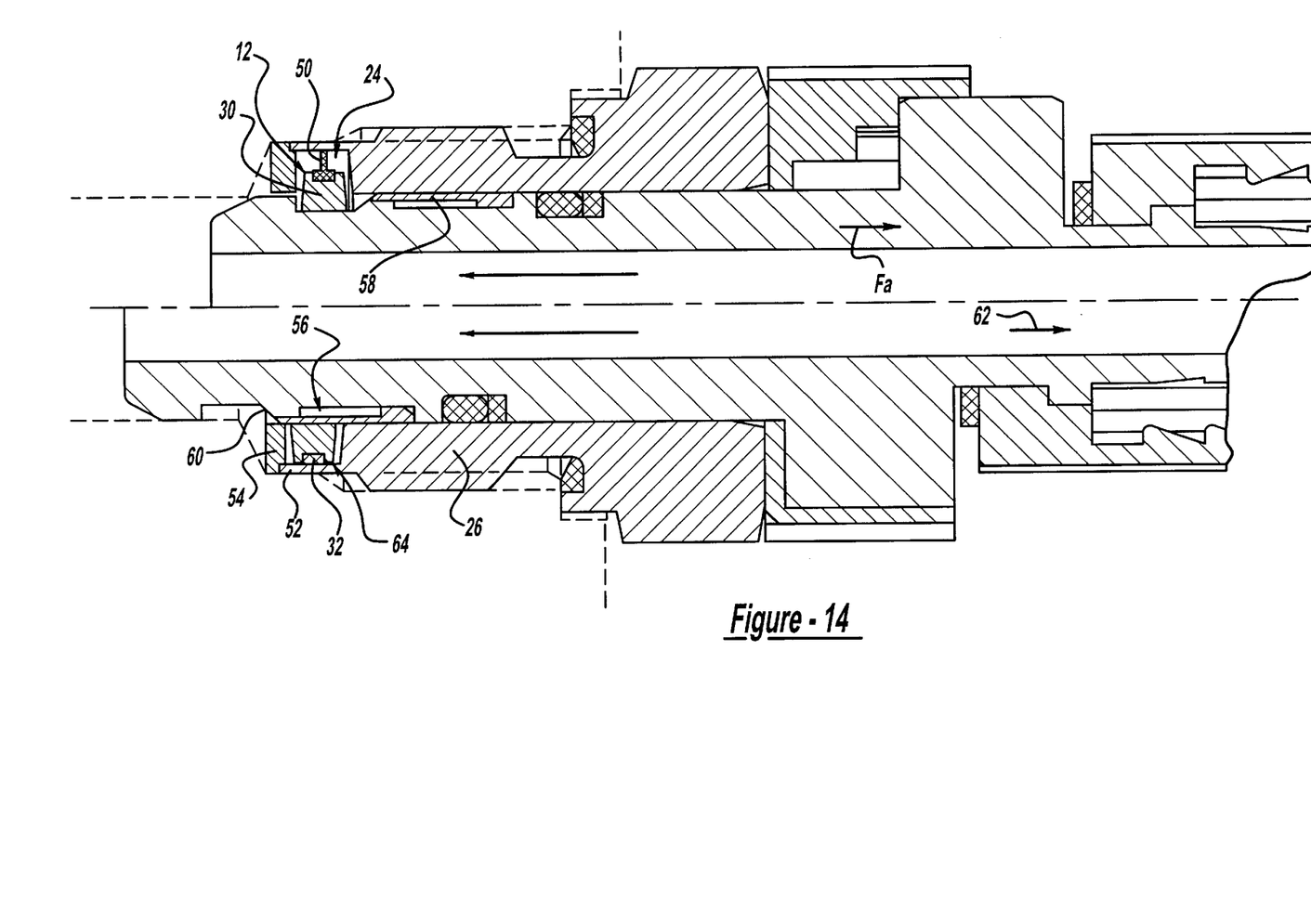
FIG. 14 is a view similar to FIG. 11, but in an advantageous advancement of this embodiment.

In the embodiment according to FIGS. 10 through 12, it is additionally provided that the holding element's 12 annular segments 30 practically lie against each other in the peripheral direction and are only separated from each other by tiny cracks (see FIG. 11, in particular). For this, the locating chamber 24 is designed as an inner circular groove continuously around the perimeter between the base part 20 and the housing component's 2 locking part 22. In the advancement seen in FIGS. 14 and 15, it is advantageously provided to form the locating chamber 24 from the insert 26 alone. For this, the insert 26 has a cylindrically hollow crosspiece section 52, which coaxially borders the chamber 24 on the outside. A ring part 54 can be placed on this crosspiece section 52, practically as a sealing cover, for bounding the chamber 24 axially. Even here, similarly to the embodiments with the retainer 40, there is simple assembly of the holding element's 12 individual annular segments 30 because the annular segments 30 are inserted into the chamber 24 before assembly of the insert 26; the chamber 24 is then sealed with the ring part 54, pressed in by a press fit in particular. The ring part 54 can also be clipped on the crosspiece section 52.

On the basis of the ring in accordance with FIG. 11, which is formed by the annular segments 30 lying next to each other and practically continuous in the peripheral direction, a maximal retention force is guaranteed by maximizing the surfaces carrying it in the axial direction.

In all of the preferred embodiments illustrated, a release mechanism 56 is provided to advantage, of such a type that, starting from the inserted and locked assembly position, the holding element 12 is brought into a release position by inserting the connector component 4 farther, unblocking the arresting step 14 and outer ring groove 16 (see the bottom halves of FIGS. 1, 9, 10, and 14, respectively), and is so held in this release position that the connector component 4 can be removed from the locating opening 8 unhindered without the holding element 12 being able to engage the circular groove 16 again. For this, the release mechanism 56 has a socket-shaped locking bolt 58 for the circular groove 16, of such a type that, in the released position, the holding element 12 comes to a radial rest on the locking bolt 58 and is thereby held in the release position, and, when the connector is being released, the circular groove 16 is covered by the locking bolt 58 and is blocked from mating with the holding element 12 in the radial direction in this way. Moreover, the circular groove 16 is bounded on one side by a sloped surface 60 in such a way that the holding element 12 and the annular segments 30 are brought across the sloped surface 60 into the release position by farther insertion of the connector component 4. In the preferred embodiments, where the holding element 12 is located in the housing component 2, the locking bolt 58 sits relatively slidable on the connector component's 4 connecting shaft 6. Proceeding from the momentary situation drawn in the bottom half of FIG. 1 for example, the connecting shaft 6 can be pulled out in the direction of the arrow 62, since the locking bolt 58 first remains in the illustrated position and the connector component's 6 outer ring groove 16 is therefore locked from engaging the annular segments 30. Additional details of this specialized release mechanism 56 are contained in the applicant's older German patent application 197 07 371.9, hereby incorporated by reference. At this point, reference is made to the full scope of this older application.

In another advantageous embodiment of the invention, special blocking agents 64 are provided for automatic fixed holding of the holding element 12 in its arrested position engaging behind the arresting step 14 in case of an impingement of the connector component 4 with an axial force $F_a$ operating in the release direction. This axial force $F_a$ can correspond to a mechanical pull or arise from internal pressurization of the plug-in coupling. In the embodiments according to FIGS. 10 through 15, these blocking agents 64 consist of slanted or basically conical effective surfaces 66 and 68, cooperating by axial arrangement, of the holding element 12, or of the annular segments 30 and at least one of the two coupling components 2, 4. The effective surfaces 66, 68 are thereby aligned so that each annular segment 30 of the holding element 12 is pressed with a retaining force operating radially in the engaging direction by the force $F_a$ operating in the release direction. In the preferred examples, the one effective surface 66 is formed by an appropriately slanted end surface of the holding element 12 or the annular segments 30; see FIG. 12 in particular. The other slanted effective surface 68 is preferably formed by a graduated surface of the insert 26. Appropriate, i.e. similarly working, effective surfaces can also be provided on the axially opposing side of the holding element 12 and in the region of the arresting step 14. This advantageous embodiment achieves that the radial retaining force is practically proportional to the force $F_a$ operating in the release direction, so that the following holds: the larger the force $F_a$, the larger also the radial retaining force which holds the annular segments 30 in their arrested position.

Alternatively, possibly even additionally, to the slanted effective surfaces 66, 68 provided as blocking agents 64, in the embodiment according to FIGS. 16 through 20, an axially slidable annular piston 70 is provided as blocking agent, which, through the internal pressurization (cf. the arrow p drawn in FIG. 16), can be slid axially with a hollow cylindrical safety bolt 72 into an annular gap 74 coaxial to the holding element 12 in such a way, that the radial arrangement on the annular piston's 70 safety bolt 72 blocks the radial release movement of the holding element's 12 annular segments 30. The annular piston 70 is sealed on the outside against the housing component's 2 locating openings by a first seal 74, and inside against the connecting shaft 6 by a second seal 76. Here in the inserted position, the internal system pressure p (see FIG. 18) only operates on the annular piston's 70 internal end surface 78, whereby it is shifted axially by pressurization. This embodiment is of advantage above all in combination with the release mechanism 56 described above, since high security against undesired release is attained. Preferably, the annular piston 70 is held in its safety position according to FIG. 18 by arresting agents 80 in particular even in the unpressured state later. In order to still be able to release the connector then, the annular piston 70 has a driving element 82, rising radially inwards, which attains such an arrangement with the connecting shaft 6, so that the annular piston 70 is brought into its position of FIG. 19 with the annular segments 30 released, during farther inserting motion of the connector component 4 required for release. The holding element's 12 annular segments 30 can then be pushed into their release position, so that the connector 4 can subsequently be extracted in the direction of the arrow 62 in accordance with FIG. 20. In addition, the arresting agents 80 also advantageously serve for fastening the annular piston 70 to the insert 26 in advance for assembly, specifically in the relative position according to FIG. 16. The annular piston 70 can thereby be jointly inserted into the base part 20 with the insert 26 (captive pre-assembly).

The invention is not limited to the illustrated and described examples, but also includes all embodiments which have the same concept as the invention. The holding element 12 in accordance with the invention is therefore also basically suitable for embodiments, whereby the holding element is pre-assembled on the connector component 4 and the annular segments 30 are pushed radially inwards by an inner cone of the housing component 2 upon insertion, until they engage behind a corresponding arresting step of the housing component. For this, the spring lock washer component for producing the spring resistance operating outwards would certainly be arranged in the interior of the circular perimeter. A wire lock washer, for example, would be completely suitable for this.

The invention is furthermore also not limited to the combination of features defined in claim 1 so far, but can also be defined by every other desired combination of particular characteristics of all disclosed individual characteristics as a whole. This means, that, in principle, practically every individual characteristic of claim 1 can be left out or replaced by at least one individual characteristic disclosed at another place in the application. Claim 1 is to be understood merely as a first attempt at formulating an invention so far.

What is claimed is:

1. A plug-in coupling for pressure application systems, comprising two coupling components, including a housing component and a connector component, said connector component being sealingly insertable into a locating opening of said housing component, and being arrestable against loosening by a locking device, said locking device having an elastically deformable holding element, which is located on the side of one coupling component such that, in the inserted state, it engages behind an arresting step of the other coupling component, locking with positive fit, for arresting said connector component, characterized by, that the holding element is designed ring-shaped and comprises of several individual annular segments and one concentric spring lock washer component which presses said annular segments with radially operating spring resistance, that each annular segment can move radially against the spring resistance of said spring lock washer component during the plugging-in of the connector component into the housing component, and wherein a blocking means for automatic fixed holding of said holding element in its arrested position engages behind said arresting step in case of an impingement of said connector component with an axial force operating in the release direction arising from mechanical pull or internal pressurization.

2. The plug-in coupling according to claim 1, characterized in that said individual annular segments are relatively inelastic and dimensionally stable.

3. The plug-in coupling according to claim 1 characterized in that said holding element comprises at least three radially symmetrical annular segments.

4. The plug-in coupling according to claim 1 characterized in that said radially elastically deformable spring lock washer component is made of one selected from a group consisting of a wire lock washer, a helical lock spring and an elastic molded ring.

5. The plug-in coupling according to claim 1 characterized in that said holding element is mounted in the region of said locating opening of said housing component formed by an outer ring groove on said connector component.

6. The plug-in coupling according to claim 5 characterized in that said spring lock washer component encircles said annular segments and presses radially with spring resistance directed inwards.

7. The plug-in coupling according to claim 1 characterized in that said individual annular segments consist of a solid material selected from the group of plastic and metal.

8. The plug-in coupling according to claim 7 characterized in that said annular segments on their surface facing radially outwards, each have a retaining groove running around the perimeter for said spring lock washer component.

9. The plug-in coupling component according to claim 1 characterized in that each annular segment comprises of at least two individual elements lying after each other as seen from the direction of insertion.

10. The plug-in coupling according to claim 9 characterized in that said individual elements are lamellar and are comprised of metal.

11. Plug-in coupling according to claim 9 characterized in that between one and six, similar lamellar individual elements lie together as a package.

12. The plug-in coupling according to claim 11 characterized in that said spring lock washer component is designed as an elastic profiled ring which radially and axially engages around said lamellar individual elements to hold said elements together in a package-like arrangement.

13. The plug-in coupling according to claim 12 characterized in that said annular segments lie next to each other in the direction of the perimeter.

14. The plug-in coupling according to claim 1 characterized in that said annular segments are coupled to a retainer (40).

15. The plug-in coupling according to claim 14 characterized in that said retainer is an integral component of said locking part.

16. The plug-in coupling according to claim 14 characterized in that said retainer is formed by a radial slot with axial fastening crosspieces separated by slots and a ring land on one end.

17. The plug-in coupling according to claim 14 characterized in that said retainer is made by an axial slot with a ring part mounted releasable on one end.

18. The plug-in coupling according to claim 14 characterized in that said annular segments of said holding element are each separated from each other in the peripheral direction by a spacing formed by an axial fastening crosspiece of said retainer.

19. The plug-in coupling according to claim 18 characterized in that said spring lock washer component encircles said fastening crosspieces for centering said holding element and said annular segments.

20. The plug-in coupling according to one claim 1 characterized in that said housing component includes two detachably connected parts, a base part and a locking part, whereby these two parts jointly border a locating chamber for said holding element.

21. The plug-in coupling according to claim 20 characterized in that said locking part is designed as a basically hollow cylindrical insert which can be inserted locally into an opening of said base part as a male fitting.

22. The plug-in coupling according to claim 1 characterized in that said spring lock washer component has radial, elastically deformable centering shoulder elements.

23. The plug-in coupling according to claim 1 characterized in that said blocking means comprise slanted effective surfaces cooperating by axial arrangement of the holding element and of said respective coupling components in such a way that each annular segment of said holding element is pressed over said slanted effective surfaces with a radial retaining force by the axial force operating in the release direction.

24. The plug-in coupling according to claim 1 characterized in that said blocking means comprises an axially slidable annular piston which, through internal pressurization can be slid axially with a safety bolt into an annular gap coaxial to said holding element in such a way that the radial arrangement on said annular piston's safety bolt blocks the radial release movement of said holding element's annular segments.

25. The plug-in coupling according to claim 1 characterized in that said individual annular segments have a basically rectangular annular cross section.

26. The plug-in coupling according to claim 1 characterized in that said holding element comprises four radially symmetrical annular segments.

* * * * *

UNITED STATES PATENT AND TRADEMARK OFFICE
CERTIFICATE OF CORRECTION

PATENT NO. : 6,095,569
DATED : August 1, 2000
INVENTOR(S) : Hilmar Hester

It is certified that error appears in the above-identified patent and that said Letters Patent is hereby corrected as shown below:

Column 8,
Line 56, claim 13, after "annular segments" please insert -- of said holding element --.

Signed and Sealed this

Eighteenth Day of September, 2001

Attest:

NICHOLAS P. GODICI
Attesting Officer  Acting Director of the United States Patent and Trademark Office